June 9, 1964  P. NIXON  3,136,332

MAGNETIC GATE VALVE

Filed April 18, 1960

INVENTOR
PHILLIP NIXON

BY

ATTORNEY

United States Patent Office 3,136,332
Patented June 9, 1964

3,136,332
MAGNETIC GATE VALVE
Phillip Nixon, 600 Glendale Drive, Glenview, Ill.
Filed Apr. 18, 1960, Ser. No. 22,899
4 Claims. (Cl. 137—416)

This invention relates to liquid controlling valves, and consists more particularly in new and useful improvements in a gate-type valve for use in connection with a water closet flush tank or similar unit requiring a float actuated valve.

Installations of this type and particularly water closets, are notoriously objectionable due to the noise transmitted through a piping system as the flush tank valve gradually closes under the influence of the float and is slowly pinched down by the rising float buoyancy. It is the primary object of this invention to provide a valve which overcomes this objectionable feature by the use of a magnet which causes the valve gate to remain in open position so as to permit the flow of water at full pressure until the buoyancy of the float which is operatively connected to the valve, exerts sufficient pressure to overcome the magnetic force on the valve gate, whereupon the valve closes with a snap action under the force of the float.

Another object of the invention is to provide a novel float controlled valve of this character wherein the sliding gate is mounted in a valve housing provided with guideways designed to facilitate the arcuate movement of the gate to and from open and closed positions, in response to the pivotal movement of a float rod connected thereto.

Still another object of the invention is to provide a valve of the type above referred to including resilient pivot means adjustable longitudinally of the float rod to thereby make possible the adjustment of the pivot point of the rod to insure optimum performance of the valve under the opposing forces of the float and magnet.

With the above and other objects in view which will appear as the description proceeds, the invention consists in the novel features herein set forth, illustrated in the accompanying drawings and more particularly pointed out in the appended claims.

Referring to the drawings in which numerals of like character designate similiar parts throughout the several views.

Figure 1:
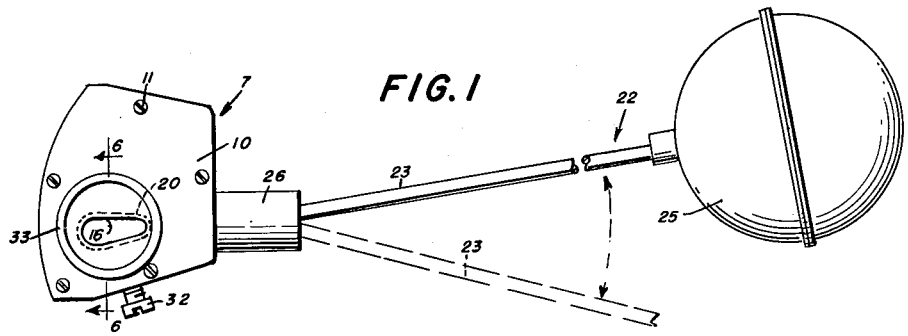
FIG. 1 is a view in side elevation showing the valve assembly and the float attached thereto.
Figure 2:
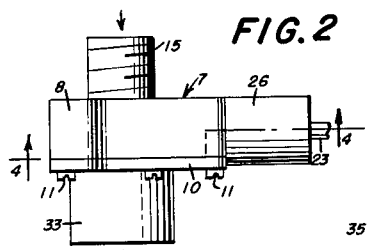
FIG. 2 is a top plan view of the valve shown in FIG. 1.

In the drawings, 7 represents the valve body proper which consists of a housing 8 forming a valve chamber 9 which is closed by a removable cover plate 10 secured in place by suitable screws 11 passing through registering apertures 12 and 13 in the cover plate and housing respectively. The rear wall of the housing 8 is provided with an inlet port 14 which is preferably bounded by an externally threaded nipple 15 adapted to be connected to a liquid inlet pipe (not show) by means of which the valve body may be supported in a selected position in a toilet flush tank or other vessel wherein the liquid level is to be controlled.

Figure 5:
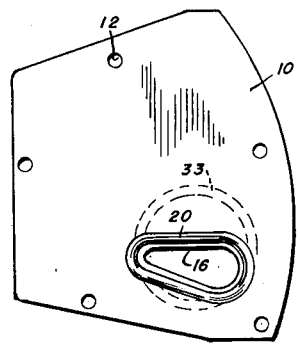
FIG. 5 is an enlarged view taken on line 5—5 of FIG. 3, showing the interior of the closure plate.

In the form of the invention illustrated, the cover plate 10 is provided at a point opposite the inlet port 14, with a discharge port 16 which is preferably but not necessarily, horizontally elongated and of substantially elliptical shape as shown in FIGS. 1 and 5, to facilitate quick action of the valve gate in opening and closing, as will later appear.

Figure 4:
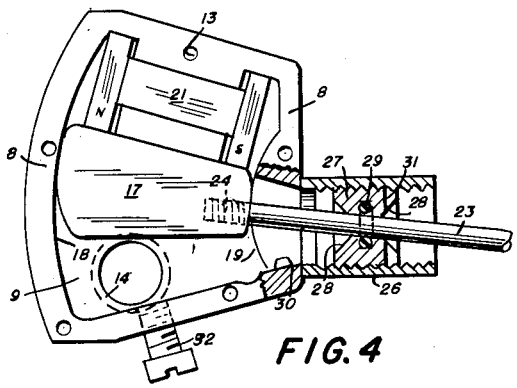
FIG. 4 is a longitudinal sectional view on an enlarged scale, taken on line 4—4 of FIG. 2, with the closure plate of the valve housing removed.
Figure 6:
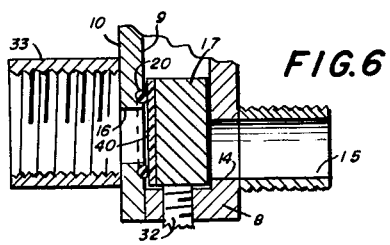
FIG. 6 is an enlarged sectional view taken on line 6—6 of FIG. 1 with the gate in closed position.

Within the chamber 9 a valve gate 17 is slidably positioned for movement in an arcuate path to and from open and closed positions with respect to the discharge port 16, said arcuate path being defined by spaced arcuate guideways 18 and 19 formed in the end walls of the chamber 9 as best seen in FIG. 4. The valve gate 17 consists of a flat body of suitable magnetic metal interposed between the inlet and outlet ports 14 and 16 respectively, and of a thickness to permit sliding movement in the chamber 9 to and from open and closed positions with respect to the discharge port 16, its longitudinal extremities slidably engaging the respective guideways 18 and 19 which not only retain the gate 17 in place in the chamber, but direct its path of travel. Preferably, the discharge port 16 is bounded by a gasket in the form of an O-ring 20 arranged in the inner face of the closure plate 10 and protruding laterally inwardly therefrom for sealing engagement with the adjacent face of the gate 17 when the latter is in closed position as shown in FIG. 6.

The housing 8 and closure plate 10 are formed of nonmagnetic material such as brass and in the upper portion of the chamber 9, there is mounted a permanent magnet 21, positioned to exert a margnetic force which constantly urges the valve gate 17 to its uppermost or open position as shown in FIG. 4. This magnet is formed of Alnico and magnetized, and its pole pieces are formed of stainless steel to avoid rust and corrosion and are of a width corresponding to the thickness of the valve gate 17, so that the latter shields the ends of the pole pieces by direct contact when the valve is open. Opposing the magnetic force of magnet 21 is a float mechanism generally designated by the numeral 22, comprising a float rod 23, threaded at its inner end as at 24 to engage a complimentary threaded opening in the adjacent end of the valve gate 17 and carrying at its outer extremity a conventional float ball 25. The final rod 23 is pivotally mounted with respect to the housing 8 by means of an internally threaded sleeve 26, adapted to receive an externally threaded adaptor 27. This adaptor is centrally apertured to receive the float rod 23, the central aperture terminating at its opposite extremities in flaring mouths 28 to accommodate the pivotal movement of the float rod 23 about an axis defined by a resilient O-ring 29 which surrounds the central opening in the adaptor 27 frictional engagement with the rod 23. It will also be seen from FIG. 4 that the end wall of the housing 8 adjacent the pivot supporting sleeve 26 is provided with a flaring slot 30 to accommodate the swinging movement of the rod 23 about its pivot.

To enable the longitudinal adjustment of the pivot adaptor 27 in the sleeve 26, the outer end of the adaptor is provided with a transverse slot 31 for receiving a suitable adjusting tool. Thus, by moving the adaptor 27 inwardly or outwardly in the sleeve 26, the pivot point 29 can be shifted longitudinally of the rod 23, to thereby permit regulation of the opposing forces of the magnet 21 and the float mechanism 22 with respect to the sliding valve gate 17 as will later appear.

If desired, a set screw 32 may be provided in the lower wall of the housing 8 to adjust the lower limit of movement of the gate 17, and in addition, may be used as a drain plug should it be necessary to flush the chamber 9. Also, it may be desirable to provide an internally threaded sleeve 33 on the outer face of the closure plate 10 around the discharge opening 16 for connection to a liquid conducting pipe leading to the bottom of the flush tank or the like (not shown).

As previously indicated, this valve assembly is for use in connection with a water closet flush tank or similar vessel and is installed therein in the position shown in FIG. 1, with the water inlet pipe (not shown) connected to the nipple 15. Normally, when the tank is at the proper liquid level, the float 25 is in its uppermost position shown in full lines, the buoyancy of the float maintaining the valve gate 17 in closed position with respect to the discharge port 16, in sealed engagement with the O-ring 20. Upon flushing the tank, the float ball 25 drops with the level of the liquid to the dotted line position in FIG. 1, sliding the valve gate 17 upwardly to the position shown in FIG. 4 where it is retained by the force of magnet 21. Th strength of the magnet 21 is such as to hold the gate 17 in its uppermost or open position as the liquid level in the tank rises, despite the opposing force of the float mechanism 22, so that a full flow of liquid from inlet port 14 continues through the valve until the liquid in the tank reaches a predetermined level. At this point, the buoyancy of the float ball 25 overcomes the magnetic force of the magnet 21 and immediately closes the valve gate 17 over the discharge port 16 with a snap action, thus preventing the objectionable water noise caused by gradually pinching off the valve in conventional structures. In this connection, it will be noted that due to the particular contour of the discharge port 16 with its upper and lower edges substantially parallel with the lower edge of the gate 17 throughout the arcuate sliding movement of the latter, this snap action of the valve is facilitated. In other words, there is no gradual closing of the port 16 as would be the case if said port were circular and the gate 17 progressively cut across the circle.

As previously explained, the effective relationship between the buoyancy of the float mechanism 22 and the magnetic force of the magnet 21 can be adjusted by varying the longitudinal position of the pivot adaptor 27 with respect to the float rod 23.

Among the advantages of the valve assembly comprising this invention, is its simplicity and ease of assembly and disassembly. With the cover plate 10 removed as in FIG. 4, the magnet 21 can be easily installed in the chamber 9 and the gate 17, with the float rod 23 moved, is simply placed in the chamber with its longitudinal extremities in engagement with the guide tracks 18 and 19. With the gate in this position, the float rod 23 with the pivot adaptor 27 loosely engaged thereon, is screwed into the end of the gate 17 as at 24. Thereafter, the adaptor 27 is screwed into the sleeve 26 to the proper position to effect the desired force relationship between the float ball 25 and the magnet 21. Thereafter, the closure plate 10 is installed on the housing 8 and the valve assembly is ready for installaion in a liquid containing vessel.

It may also be noted that the valve gate 17 is never exposed to atmosphere during its operation and it is thus protected from the accumulation of dirt and grit which would interfere with the complete sealing of the valve when closed.

Figures 3, 7:
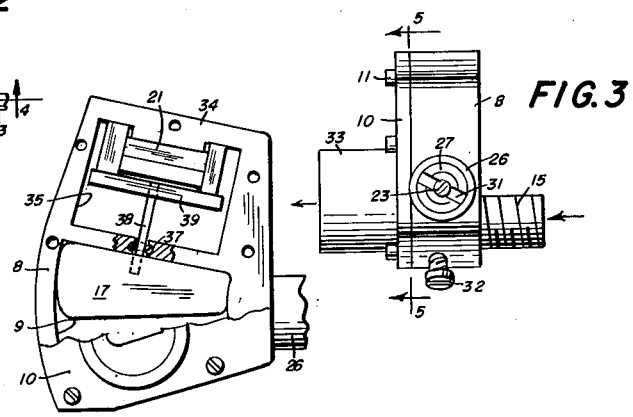
FIG. 3 is an endview of the valve with the float arm shown in transverse section.
FIG. 7 is a sectional view showing a modified form of the invention.

A further means for avoiding contamination of the magnet by the possible accumulation of foreign matter in the valve housing, is illustrated in FIG. 7. Here it will be seen that the valve housing 8 is provided with an extension 34 which forms a magnet chamber 35, separated from the valve chamber 9 by a centrally apertured partition 36. In this form of the invention, the valve gate 17 has attached to its upper edge, a magnet rod 38 which projects through the central opening in the partition 36 and is embraced by an O-ring 37 preferably formed of Teflon. The upper end of the rod 38 carries a transverse plate 39 of magnetic material, arranged for operative engagement with the magnet 21 which is mounted in the upper end of the magnet chamber 35.

With this modified form of the invention, it will be apparent that no fluid is permitted to enter the magnet chamber 35, due to the partition 36 and the sealing engagement of the O-ring 37 with the rod 38. By using Teflon for the O-ring 37, a free sliding movement of the rod 38 is permitted, while at the same time maintaining an adequate seal between the chambers 9 and 35. Otherwise, the operation of this modified form of valve is the same as that previously described.

It is also contemplated in connection with either form of the invention, that the valve gate 17 may be provided with a Teflon face on its side which engages the O-ring 20 bounding the discharge port 16. Such an arrangement is shown at 40 in FIG. 6, from which it is clear that the slippery plastic surface of the Teflon, while effectively sealing against the O-ring 20, will greatly facilitate the sliding movement of the valve gate to and from open and closed positions.

While I have shown and described this invention as applied to a water closet flush tank, it will be understood that many other adaptations are possible with equal effect.

From the foregoing, it is believed that the invention may be readily understood by those skilled in the art without further description, it being borne in mind that numerous changes may be made in the details disclosed without departing from the spirit of the invention as set forth in the following claims.

I claim:

1. A liquid level control valve comprising a housing having inlet and outlet ports, a valve gate of magnetic metal slidably engageable with said outlet port, to and from open and closed positions, guide means in said housing directing the movement of said gate in an arcuate path, a magnet biasing said gate toward open position, a float rod connected to said gate at one end and carrying a float at its other end, and pivot means adjustable longitudinally with respect to said float rod, carried by said housing and resiliently supporting said float rod for pivotal movement, said float having a buoyancy designed to overcome the force of said magnet at a predetermined liquid level, to shift said gate to closed position.

2. The liquid level control valve of claim 1 wherein said guide means comprises a pair of spaced arcuate guideways formed in the end walls of said housing.

3. The liquid level control valve of claim 1 wherein said pivot means comprises a resilient ring carried within a threaded sleeve having outwardly flared ends through which said float rod pivotally extends.

4. The liquid level control valve of claim 1 wherein said outlet port is generally wedge-shaped and said valve gate is also generally wedge-shaped, the upper and lower edges of the said outlet port being substantially parallel with the lower edge of the said valve gate throughout the sliding movement of the gate to and from a closed position whereby the flow control is progressively uniform.

References Cited in the file of this patent

UNITED STATES PATENTS

| | | |
|---|---|---|
| 2,608,207 | Levan | Aug. 26, 1952 |
| 2,925,994 | Downs et al. | Feb. 23, 1960 |
| 2,950,081 | Steinbuch et al. | Aug. 23, 1960 |
| 2,952,265 | Isaacson | Sept. 13, 1960 |
| 2,961,214 | Freed | Nov. 22, 1960 |

FOREIGN PATENTS

| | | |
|---|---|---|
| 16,955 | Denmark | Feb. 3, 1913 |
| 764,876 | Great Britain | Jan. 2, 1957 |
| 975,802 | France | Oct. 17, 1950 |